United States Patent
Mundheim

(10) Patent No.: US 10,889,513 B2
(45) Date of Patent: Jan. 12, 2021

(54) METHOD FOR REMOVING IMPURITIES FROM A FLUID STREAM

(71) Applicant: M Vest Water AS, Bergen (NO)

(72) Inventor: Atle Mundheim, Omastrand (NO)

(73) Assignee: M Vest Water AS, Bergen (NO)

( * ) Notice: Subject to any disclaimer, the term of this patent is extended or adjusted under 35 U.S.C. 154(b) by 0 days.

(21) Appl. No.: 16/483,447

(22) PCT Filed: Feb. 8, 2018

(86) PCT No.: PCT/NO2018/000005
§ 371 (c)(1),
(2) Date: Aug. 5, 2019

(87) PCT Pub. No.: WO2018/147742
PCT Pub. Date: Aug. 16, 2018

(65) Prior Publication Data
US 2020/0017380 A1    Jan. 16, 2020

(30) Foreign Application Priority Data
Feb. 9, 2017 (NO) .................................. 20170200

(51) Int. Cl.
| | | |
|---|---|---|
| B01D 17/04 | (2006.01) | |
| C02F 1/00 | (2006.01) | |
| C02F 1/40 | (2006.01) | |
| C02F 101/32 | (2006.01) | |
| C02F 9/00 | (2006.01) | |
| C10G 33/04 | (2006.01) | |
| C02F 1/24 | (2006.01) | |
| C02F 1/28 | (2006.01) | |
| C02F 1/38 | (2006.01) | |
| C02F 1/56 | (2006.01) | |

(52) U.S. Cl.
CPC .............. *C02F 1/56* (2013.01); *B01D 17/047* (2013.01); *C02F 1/24* (2013.01); *C02F 1/286* (2013.01); *C02F 1/38* (2013.01); *C02F 1/40* (2013.01); *C02F 9/00* (2013.01); *C10G 33/04* (2013.01); *C02F 2001/007* (2013.01); *C02F 2101/325* (2013.01)

(58) Field of Classification Search
CPC .... B01D 17/047; C02F 1/56; C02F 2101/325; C10G 33/04
See application file for complete search history.

(56) References Cited

U.S. PATENT DOCUMENTS

| | | | |
|---|---|---|---|
| 2007/0235391 A1 | 10/2007 | Yklingas | |
| 2009/0023614 A1 | 1/2009 | Sullivan | |
| 2011/0203977 A1* | 8/2011 | Tada ..................... | C02F 1/5209 210/96.1 |
| 2013/0168095 A1 | 7/2013 | Loveless | |
| 2016/0083808 A1* | 3/2016 | Ramarao ................ | B01D 21/01 435/160 |

FOREIGN PATENT DOCUMENTS

| | | |
|---|---|---|
| EP | 2502971 | 9/2012 |
| JP | H04/ 74592 | 3/1992 |
| JP | 2015 226898 | 12/2015 |

OTHER PUBLICATIONS

Ishikawa, Teneaki et al—JPH0474592A Machine Translation—Mar. 9, 1992 (Year: 1992).*
Gioia, Francesco et al—The containment of oil spills in porous media using xanthan/aluminum solutions, gelled by gaseus CO2 or by AlCl3 solutions—Journal of Hazardous Materials B138 (2006) 500-506 (Year: 2006).*
Nolte, Heike et al—Gelatin of xanthan with trivalent metal ions—Carbohydrate Polymers 18 (1992) 243-251 (Year: 1992).*
ISRWO, as statement of relevance for non-english citations.

* cited by examiner

*Primary Examiner* — Bradley R Spies
(74) *Attorney, Agent, or Firm* — Christian D. Abel

(57) ABSTRACT

A method for the separation and removal of organic and inorganic contamination in fluids where water is the continuous phase and oil contamination is present in the continuous phase, is described. Xanthan and/or Guar in the unsolved state dispersed in nonpolar solvent of de-aromatized aliphatic or a synthetic isoparaffine, immiscible with water and miscible with oil, is dosed into the fluid.

3 Claims, No Drawings

METHOD FOR REMOVING IMPURITIES FROM A FLUID STREAM

The present invention relates to removal of, and further treatment of, unwanted organic and inorganic contamination in fluids in which water is the continuous phase, as presented in the following claims.

In specific the present invention relates to separating organic and inorganic contamination from a continuous water phase in which oil contamination is a part of the discontinuous phase, according to the invention, wherein either Xanthan or Guar, or a mixture of Xanthan and Guar, are blended into the continuous fluid stream by mechanical or static mixing. Xanthan, or Guar, or a combination of both, then adhere to the contamination, and then reacts in a next step wherein dissolved trivalent aluminum, iron or chromium cations are blended into the fluid by mechanic or static mixing. In this way the polysaccharide chains in Xanthan and/or Guar gets cross-linked by said cations so that contamination with adhered polysaccharides immediately form large and easily separable conglomerates.

In detail, the present invention relates to mixing of preferably one or more of the said polysaccharides, wherein these, in particle state, preferably as fine-grained powder, are suspended in a nonpolar solvent, preferably a hydrocarbon solvent, where most preferred is a de-aromatized aliphatic or synthetic isoparaffin, where the solvent is immiscible with water but miscible with oil. In such an applied suspension, neither Xanthan nor Guar will dissolve or swell, but will remain in wetted particle state.

Further, the present invention relates to a complementing dosing configuration in which water is added to the suspension of solvent and polysaccharide, under sufficient mixing to create an oil in water emulsion. This suspension will then be permanently stable with water dissolved polysaccharide as stabilizer.

The present invention further relates to mixing of unsolved polysaccharide and solvent into a continuous and contaminated water flow, or by mixing of a stable emulsion of solvent and polysaccharide and water into a contaminated continuous water flow. The mixing is then applied by sufficient shear forces so that solvent and present contamination in the water stream mechanically emulsifies, and solid polysaccharide dissolves directly in contaminated fluid flow. Alternatively, dissolved polysaccharides from the stabilized emulsion are homogeneously mixed into the fluid flow simultaneously as emulsified oil with adhered hydro colloid from the emulsion, is emulsified with oil contamination in the polluted continuous fluid flow, and further that particles and colloids in the polluted fluid flow are brought into contact with dissolved polysaccharide and nonpolar solvent.

Further, the present invention relates to separating the cross-linked, large conglomerates consisting of contamination, solvent, polysaccharides and trivalent ions from liquid stream.

The present invention is also related to an application of the described process.

The present invention is related to the technology that concerns purification of oily water, and then in particular from the oil and gas industry, such as produced water from reservoirs which is separated from the oil, slop water generated at oil installations, water from well stimulation and well testing, fracturing and enhanced oil recovery (EOR) operations as well as polluted water from refineries.

It is well known that Xanthan and Guar can be dispersed in organic oils, and that polysaccharide chains are strongly viscosifying, and oil/water emulsions are stabilizing. Both these polysaccharides are commonly used for viscosifying and stabilizing emulsions in the food and cosmetic industries. It is also well known that they create gels by cross linking with, among others, trivalent ions. In the oil and gas industry, Xanthan and Guar are used as viscosifying polysaccharide for fracturing shale gas formations. Prior to this they are cross linked and stabilized. They are also widely used in drilling fluids as thixotropic viscosifiers for transportation of particles in drilling muds, and for stabilizing the particles in a suspension when no liquid flows. It is also well known that polysaccharides and hydrocolloids cross link with divalent and multivalent ions, and it is well known that when these are heavily diluted in advance in water without such ions can be brought to flocculation of pollution when injected into a continuous water flow of contaminated liquid in which polysaccharide and hydrocolloid after adhering to contamination are cross-linked with existing or added multivalent cations in the contaminated water flow. It is also well known that potable water dilutions must be significant to prevent premature cross linking before contact between polysaccharide and contamination takes place. It is known that typically, such a dilution requires a potable water consumption of 240 to 480 m3/day to dilute polysaccharide when a 5-ppm polysaccharide solution is dosed to a typical saline produced water into a process flow of 2000 m3/hr in a 0.1% dilution in potable water Highly saline water requires twice as much potable water. Often such potable water must be produced at the offshore installations or extracted from groundwater in areas which is in lack of water.

It is not known that one can bring forth an improved separation by dosing unsolved Xanthan or Guar together with nonpolar organic solvent into a continuous flow of contaminated water where oil, monovalent and divalent cations are present. It is also not known that an improved oil water separation can be introduced by first creating a stable emulsion of Xanthan and/or Guar, that in a particle state, immediately solves by mixing into an emulsion together with nonpolar organic solvent that emulsifies with the existing oil contamination in the water. It is also not known to create a stable emulsion of non-polar organic solvent immiscible in water, in which Xanthan is in advance dispersed in the solvent, where in this emulsion non-polar emulsified solvent is encapsulated by polysaccharide chains, where after the composition then is emulsified with polluting oil and particles in a continuous fluid stream, where after emulsion/pollution is brought to separable large conglomerates by crosslinking upon dosing into the flow a mixture of trivalent cations.

It is an advantage of the present invention that unsolved Xanthan and/or Guar can be used together with nonpolar organic water immiscible solvent directly in the contaminated water flow. Consumption of water is avoided.

It is an advantage of the present invention that unsolved dispersed highly concentrated mixture of Xanthan and/or Guar, in which the pumpability of the solution is upwards limiting, can be used. Premature gelling will not take place, and the polysaccharides dissolves by mixing in the process water stream independent of salinity as long as trivalent ions are not present. According to present invention, this method requires no prior addition of water.

It is an advantage of the present invention that the solvent according to the invention is emulsified into existing oil contamination which is again emulsified into small droplets stabilized by encapsulation by polysaccharide chains which ensure that all oil, as a result of minimal droplet size, is encapsulated uniformly in cross-linked polysaccharide.

It is an advantage of the present invention that nonpolar organic solvent emulsified and stabilized with polysaccharide will during emulsification contact particles and colloids in the process water flow, where after they will be captured in cross-linked polysaccharide/solvent.

It is a further advantage of the present invention that excess polysaccharide chains will adhere by emulsifying mixing to micelles formed by the asphaltene or naphthene in a produced water flow. Such micelles are normally 200-300 nm emulsified hydrocarbon where the naphthene or asphaltene forms a nonpolar head against hydrocarbon and a negative highly polar tail against the water phase, thus forming nano emulsions that are usually very difficult to separate. The polysaccharide chains will according to the invention by crosslinking trap these micelles towards other contamination and collect micelles upon binding.

It is an advantage of the invention that by forming a stable emulsion of polysaccharide and water immiscible organic solvent, a microemulsion is obtained wherein the aqueous phase contains water-soluble polysaccharide and solvent micron and submicron drop size with adhered polysaccharide hereto prior to emulsification into the continuous contaminated aqueous phase. This ensures good emulsion with polluting oil and good adhesion of polysaccharides hence solvent adheres to polluting oil during emulsification. At the same time, hydrated polysaccharide is available for hydrophilic surfaces, micelles and colloids.

It is an advantage of the present invention that Guar and Xanthan are unaffected by ions and cations in the contaminated liquid flow so that crosslinking does not occur prematurely, provided that trivalent cations are not present.

It is an advantage of the present invention that trivalent aluminium, chromium and iron cations are not inhibited by common compositions in produced water from the oil industry. For other polysaccharides that crosslink with divalent cations, the cations will be sensitive to scale inhibitors, oxygen scavengers, corrosive inhibitors, as well as hydrogen carbonate content in the water that binds a valence in divalent cations. This allows for such polysaccharides to fail to crosslink as both valences in a cation must be free in order to give crosslinking.

Additionally, it is an advantage of the present invention that one can apply highly concentrated, dispersed Xantan in the nonpolar solvent and dose, mix and emulsify this into a small side stream of the contaminated liquid flow, and then subsequent mix and emulsify this back into the main flow of the contaminated liquid stream without the use of external water for dilution, irrespective of salinity and ion composition in contaminated liquid flow, provided that trivalent ions are not present. Thereafter one can dose in trivalent ions to obtain crosslinking.

It is an advantage of the present invention that cross-linked contamination and polysaccharide will regenerate the large separable flocs if these are mechanically broken in the process equipment after formation. This enables one dosing for multiple separation steps. For example, a first crosslinking could be applied before a hydro cyclone, and in the powerful spin that occurs, flocs could break and follow the aqueous phase out of the hydro cyclone. These will then recombine again after being broken, into large aggregates and could be further removed by flotation. Should further turbulent conditions cause a fraction of the flocs to break and follow the water phase then standard particle filtration in a media filter or in a membrane could separate these from the water phase as also oil with cross-linked Xantan and/or Guar acts as a particle.

It is an advantage of the present invention that since the contaminating oil in water is emulsified, optimally to a microemulsion, together with nonpolar solvent and Xanthan and/or Guar, all oil and particles in micron state will thereafter be encapsulated by cross-linked polysaccharide by reaction of trivalent cations. In this state all contamination will assume a particle state as a strong polysaccharide gel with contamination encapsulated. This eliminates the need for adsorption and absorption into clay and nutshell filters, which is not necessary as the particles formed do not adhere to surfaces and thus is easily filtered by traditional particle filters and other media filters that can be back-flushed.

It is an objective of the invention to provide a method of removing undesired organic and inorganic contamination in fluid where water is the continuous phase and oil contamination is present in the continuous phase, characterized in that Xanthan and/or Guar in an unsolved state is dispersed in a nonpolar solvent immiscible with water and dosed and mixed into a stabilized emulsion where contaminating oil is included in the emulsion together with solvent in which it is stabilized by dissolving unsolved Xanthan and/or Guar simultaneously with emulsion in the contaminated process water stream, after which emulsion is broken and existing organic and inorganic contamination is brought together to large easily separable conglomerates by the blending and mixing of crosslinking trivalent cations.

It is an objective of the invention to provide a method of removing undesirable organic and inorganic contamination in fluids where water is the continuous phase and oil contamination is present in the continuous phase, characterized in that Xanthan and/or Guar in an unsolved form but dispersed in nonpolar solvent immiscible with water prior to injection into the continuous oil and particle contaminated liquid stream is added water, after which oil and water are emulsified into a microemulsion and Xanthan and/or Guar dissolve in water phase stabilizing the emulsion, after which this stabilized emulsion is again injected and mixed into stable emulsion in the continuously contaminated fluid flow, after which emulsion is broken and existing organic and inorganic contamination is brought together into large and easily separable conglomerates by mixing and crosslinking trivalent cations.

It is an objective of the invention to provide a method of removing undesirable organic and inorganic contamination in fluids where water is the continuous phase and oil contamination is present in the continuous phase, characterized in that one dosing of unsolved Xanthan and/or unsolved Guar, together with nonpolar hydrocarbon solvent alone, or in a stabilized emulsion with water, as described above, may use multiple recombination of potential crushed cross-linked agglomerated flocs through several separation steps without further addition of Xanthan and/or Guar, solvent or trivalent cations.

It is an objective of the invention to provide an application of the method for separation of undesired organic and inorganic contamination in fluids where water is the continuous phase and oil contamination is present in the continuous phase, characterized in that the method is used prior to separation in one or more of; hydro cyclone, flotation unit, mechanical filter, media filter, membrane filter, decanter, centrifuge or sedimentation.

The present invention differs from known processes in that it is used a high-viscous polysaccharide, Xanthan and/or Guar dispersed in a nonpolar hydrocarbon solvent in which unsolved polysaccharide is dosed into a contaminated process water flow which may be from fresh water to saturated saline concentration, wherein also high concentrations of divalent cations may be present. Polysaccharide will regardless be solved in the process water flow by strong mixing without any premature gelling.

The present invention differs from known processes by using a nonpolar water immiscible hydrocarbon solvent in which polysaccharide is dispersed whereupon it is dissolved with oil contamination in water and, completely opposite to recognized separation principles, is emulsified into a stabilized microemulsion, wherein polysaccharide is a stabilizer for the emulsion.

The present invention differs from known processes in that according to the invention high viscous polysaccharide dispersed in nonpolar water-immiscible solvent prior to dosing into the process water stream, can be added water by appropriate mixing, and mixed to a stabilized microemulsion where polysaccharide is dissolved and stabilizes the emulsion. This can be done both in freshwater and highly saline water, and thus high saline process water can be used.

It is not known to use a microemulsion of hydrocarbon solvent with adhered polysaccharide chains, so as to emulsify this solvent with oil contamination in process water flow where excess polysaccharide chains will be available to micelles, colloids and particles in the process water flow.

The present invention differs from known processes in that one by emulsification and stabilization breaks down contamination in optimal-sized small objects, completely enclosed by the polysaccharide chains, so that when cross-linked to gel, which again glues the objects together, the oil will act as a particle without sticking to filters, filter media or membranes. This mechanism also ensures that the encapsulated small oil droplets do not leak light hydrocarbons into the aqueous phase by turbulence in a separation device after the first reaction with trivalent ions.

The present invention differs from known processes in that the total encapsulation due to the emulsification and subsequent crosslinking causes all non-separated contamination if the flocs are crushed in the first separation causing some the fragments following the aqueous phase through, again will again recombine at normal flow conditions in the process water flow, in order to be separated in a step 2. Likewise, any broken flocks will be captured by a membrane or in a mechanical filter without further chemical addition and without the flocs sticking to the media or membrane.

The present invention differs from known processes in that pre-hydrating polysaccharide is not necessary and if it is chosen to dose as a stable emulsion, even high saline process water comprising high concentrations of cations, hydrogen carbonate and the usual production chemicals such as oxygen-scavengers, scale inhibitors and corrosion inhibitors can be used.

Further, the present invention differs from known processes in that Xanthan and/or Guar can be dispersed in a typical 30% concentration (weight) in solvent and directly dosed into a high saline process water stream with large amounts of cations in the process water stream and polysaccharide will by shear-mixing and emulsifying of the solvent dissolve immediately.

A traditional hydrated polysaccharide such as salt of alginate or pectin may be dosed into a typical solution of 0.03% in fresh water to avoid premature gelling with divalent cations.

This again means that where 100 litres of dispersed polysaccharide/solvent mixture is dosed according to the present invention, 100,000 litres of fresh water will be used to dose an adequate hydrated polysaccharide of the type which is crosslinking with divalent cations. Contrary to the solution of the present invention with emulsion and solvent, this will not be practicable possible as premature gelation then would occur. In accordance with the present invention, an emulsion with solvent, Xanthan and/or Guar would typically consist of 0.5-3% polysaccharide, 5-30% solvent, 67-94.5% water. One would then get a total of about 1000 liters of liquid for injection without the need for fresh water for the polysaccharide dilution. This is a 99% freshwater savings if one in the present invention uses potable water for emulsification. However, it is usually 100% potable water savings in relation to known processes if the process water is saline and the process water itself is used for such emulsification prior to dosing. It is also a 100% saving in potable water use compared to known processes if the polysaccharide is dosed directly into process water flow dispersed in a solvent.

The method of the present invention will be explained with reference to the following example wherein:

25% by weight Xanthan was dispersed in a 1 litre de-aromatized aliphatic solvent which was immiscible in water. Dispersion was kept in suspension by gentle stirring.

A tank containing 20 litres of potable water was added 25 wt % salt in the form of NaCl2, 1.0 wt % CaCl2, 0.4 wt % MgCl2 and 2.0 wt % NaSO4. This was stock solution for the trials.

EXPERIMENT 1

1-liter stock solution of saline water was mixed with 200 ppm crude oil from North Sea and sheared into emulsion with a Thurax-mixer. Further, 5 ppm of oleic acid was sheared in to form a proportion of micelles with oil drops down to 200-300 nm of the oil contamination in the mixture.

Subsequently, 20 ppm of solvent was shear mixed with dispersed Xanthan. This corresponds to 5 ppm Xanthan. The stable emulsion obtained was then mixed and stirred with 5 ppm AlCl3.

It was observed immediate splitting of the emulsion by the mixing of AlCl3 and after 10 seconds all oil was collected in large flock at sizes of 1-2 mm. These floated to the top of the mixture after ended stirring. Clear water phase analyzes showed OIW below 0.5 ppm. This shows that micelles were cross-linked and separated.

EXPERIMENT 2

The water from Run 1 was sheared with a high speed mixer for 1 minute so that flocculated material was crushed. It was after stom mixing noted that the flocs were recombined to 1-2 mm large flocs within 20 seconds.

EXPERIMENT 3

Experiments 2 and 3 were repeated with Guar and without analyzes were performed, and visually one achieved an exact equivalent result.

EXPERIMENT 4

Experiments 2 and 3 were repeated with a 50/50% mixture of Xanthan and Guar without quantitative analyzes but visually observations confirmed exactly equivalent results.

EXPERIMENT 5

The water in Experiments 2, 3 and 4 was again re-sheared mixed for 1 minute so that the flocs were broken and then the water was immediately filtered through a 8 cm depth filter of quartz sand. All oil was stopped and analyzes showed OIW below 0.5 ppm.

EXPERIMENT 6

The filter media from Experiment 5 was then back-flushed with clean water and it was observed that all contamination was easily flushed off and that no oil adhesion was left on the media. It was also observed that back-flush water and contamination did not mix again, but flocs gathered and floated to the top of the back-flush water. The drops were completely encapsulated in cross-linked polysaccharide.

EXPERIMENT 7

Experiments 1 to 6 were repeated, except that Xanthan and/or Guar was used in solvent, where the mixtures before emulsion were additional emulsified with water. 20% solvent with polysaccharide was emulsified with 80% of saline water from stock solution. The emulsion was observed over 2 days and it was found that this was completely stable. The emulsion was then emulsified into contaminated water, in same proportions, and as in previous experiments.

All visual observations confirmed exactly the same results as previous experiments. No premature gel formation was recorded in any of the experiments.

EXPERIMENT 8

Experiments 1-7 were repeated with the difference that oxygen scavenger, scale inhibitor and corrosion inhibitor were added according to normal dosage concentrations in produced water for the respective chemicals. Such dosing and mixing were performed prior to the shear mixing of polysaccharide and solvent.

All visual observations made showed exactly the same results as previous experiments.

The invention claimed is:

1. A process for removing oil contamination in fluids where water is the continuous phase and the oil contamination is present in the continuous phase, comprising the steps of dispersing Xanthan and/or Guar in unsolved state into nonpolar solvent comprising de-aromatized aliphatic or synthetic isoparaffine, immiscible with water and miscible with oil, dosing the dispersion into the fluid, mixing the dispersion and fluid mixture to a microemulsion by shear mixing, such that any contaminating oil present in the fluid becomes included in the emulsion together with solvent, causing the contamination to be brought together into a separable conglomerate by means of blending in and mixing of crosslinking trivalent cations of aluminum, iron or chromium, and removing the conglomerated contamination from the fluid.

2. A process for removing oil contamination in fluids where water is the continuous phase and the oil contamination is present in the continuous phase, comprising the steps of
   a. dispersing Xanthan and/or Guar in unsolved state into nonpolar solvent comprising de-aromatized aliphatic or synthetic isoparaffine, immiscible with water and miscible with oil,
   b. adding water to the dispersion,
   c. mixing the dispersion and water to a microemulsion by shear mixing,
   d. injecting and mixing the microemulsion into the fluid,
   e. blending in and mixing of crosslinking trivalent cations of aluminum, iron or chromium to the fluid, wherein the contamination is brought together into a separable conglomerates, and
   f. removing the conglomerated contamination from the fluid.

3. The method according to either of claim 1 or 2, wherein the fluid is process water from the oil and gas industry.

* * * * *